US010873679B2

(12) United States Patent
    Tung

(10) Patent No.: US 10,873,679 B2
(45) Date of Patent: Dec. 22, 2020

(54) IMAGE PROCESSING DEVICE, IMAGE PROCESSING METHOD FOR EMBEDDING A WATERMARK IN A COLOR IMAGE

(71) Applicant: Rakuten, Inc., Tokyo (JP)

(72) Inventor: Tony Tung, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 149 days.

(21) Appl. No.: 16/072,877

(22) PCT Filed: Jan. 27, 2016

(86) PCT No.: PCT/JP2016/052370
    § 371 (c)(1),
    (2) Date: Jul. 25, 2018

(87) PCT Pub. No.: WO2017/130335
    PCT Pub. Date: Aug. 3, 2017

(65) Prior Publication Data
    US 2019/0045078 A1    Feb. 7, 2019

(51) Int. Cl.
    *G06K 9/00* (2006.01)
    *H04N 1/32* (2006.01)
    (Continued)

(52) U.S. Cl.
    CPC .......... *H04N 1/32309* (2013.01); *G06T 1/00* (2013.01); *G06T 1/0071* (2013.01);
    (Continued)

(58) Field of Classification Search
    CPC ............... H04N 1/32309; H04N 1/387; H04N 1/32352; H04N 1/32293; H04N 1/32229; G06T 1/00; G06T 1/0071
    See application file for complete search history.

(56) References Cited

U.S. PATENT DOCUMENTS

2005/0190948 A1* 9/2005 Isogai ................ H04N 1/32144
                                                  382/100
2006/0008112 A1* 1/2006 Reed .................... G06T 1/0085
                                                  382/100
(Continued)

FOREIGN PATENT DOCUMENTS

JP     2001-285621 A    10/2001
JP     2004-194233 A    7/2004
(Continued)

OTHER PUBLICATIONS

Shin et al, (A New Watermarking Method Using Entropy-Based Region Segmentation, Proc. SPIE 3528, Multimedia Systems and Applications, Jan. 22, 2019) (Year: 2019).*
(Continued)

*Primary Examiner* — Amara Abdi
(74) *Attorney, Agent, or Firm* — HEA Law PLLC

(57) ABSTRACT

Certainty of detecting watermarks embedded in a color image is increased. Image date acquisition means of an image processing device acquires image data on a color image having a plurality of color channels. Numerical value acquisition means acquires respective numerical values in the plurality of color channels contained in a pixel value of the color image based on the image data acquired by the image data acquisition means. Image processing means embed a watermark in each of the plurality of color channels by changing the numerical value acquired by the numerical value acquisition means.

7 Claims, 13 Drawing Sheets

(51) Int. Cl.
*H04N 1/387* (2006.01)
*G06T 1/00* (2006.01)

(52) U.S. Cl.
CPC ..... *H04N 1/32229* (2013.01); *H04N 1/32293* (2013.01); *H04N 1/32352* (2013.01); *H04N 1/387* (2013.01)

(56) References Cited

U.S. PATENT DOCUMENTS

| | | | | |
|---|---|---|---|---|
| 2011/0221933 A1* | 9/2011 | Yuan | ............... | H04N 5/2351 348/234 |
| 2013/0170695 A1* | 7/2013 | Anan | ............... | G06T 1/0021 382/100 |
| 2013/0236046 A1 | 9/2013 | Nallusamy et al. | | |
| 2016/0239935 A1* | 8/2016 | Holstun | ............. | H04N 1/387 |

FOREIGN PATENT DOCUMENTS

| | | | | | |
|---|---|---|---|---|---|
| JP | 2005-086356 | * | 7/2004 | ............ | G06T 1/00 |
| JP | 2005-086356 A | | 3/2005 | | |
| JP | 2005-192001 A | | 7/2005 | | |
| JP | 2009-200754 | * | 9/2009 | ............ | G06T 1/00 |

OTHER PUBLICATIONS

English translation of the International Search Report for PCT/JP2016/052370.

Jae-Wook Shin et al, "A New Watermarking Method Using Entropy-Based Region Segmentation", Visual Communications and Image Processing; Jan. 20, 2004-Jan. 20, 2004; San Jose,, vol. 3528, Jan. 1, 1999 (Jan. 1, 1999), pp. 531-538, XP00101130.

* cited by examiner

IMAGE PROCESSING DEVICE, IMAGE PROCESSING METHOD FOR EMBEDDING A WATERMARK IN A COLOR IMAGE

CROSS REFERENCE TO RELATED APPLICATIONS

This application is a National Stage of International Application No. PCT/JP2016/052370 tiled on Jan. 27, 2016. The contents of the above document is incorporated herein by reference in its entirety.

TECHNICAL FIELD

The present invention relates to an image processing device, an image processing method, and a program.

BACKGROUND ART

Hitherto, there is known a technology of embedding a watermark in a color image containing a plurality of color channels. For example, in Patent Literature 1, there is described a technology of embedding a watermark in a color image in order to identify a source of the color image posted in an unauthorized website.

CITATION LIST

Patent Literature

[PTL 1] US 2013/0236046 A1

SUMMARY OF INVENTION

Technical Problem

Pixel values change in a region of a color image in which the watermark is embedded, and hence the watermark can be detected by identifying the region in which the pixel values have changed. However, it may be difficult to identify the region depending on the color image. For example, when a watermark is embedded in a region in which a color presents a gradation, a pixel value of a pixel in which the watermark is embedded may change so as to be the same as adjacent pixel values. In this case, even when the pixel value in the color image is referenced, the region in which the pixel values have changed may not be identified, and the watermark may not thus be detected.

The present invention has been made in view of the above-mentioned problem, and therefore has an object to increase certainty of the detection of a watermark embedded in a color image.

Solution to Problem

In order to solve the above-mentioned problem, an image processing device according to one embodiment of the present invention includes: image data acquisition means for acquiring image data of a color image having a plurality of color channels; numerical value acquisition means for acquiring respective numerical values in the plurality of color channels contained in a pixel value of the color image based on the image data acquired by the image data acquisition means; and image processing means for embedding a watermark in each of the plurality of color channels by changing the numerical value acquired by the numerical value acquisition means.

An image processing method according to one embodiment of the present invention includes: an image data acquisition step of acquiring image data of a color image having a plurality of color channels; a numerical value acquisition step of acquiring respective numerical values in the plurality of color channels contained in a pixel value of the color image based on the image data acquired in the image data acquisition step; and an image processing step of embedding a watermark in each of the plurality of color channels by changing the numerical value acquired by the numerical value acquisition step.

A program according to one embodiment of the present invention causes a computer to function as: image data acquisition means for acquiring image data of a color image having a plurality of color channels; numerical value acquisition means for acquiring respective numerical values in the plurality of color channels contained in a pixel value of the color image based on the image data acquired by the image data acquisition means; and image processing means for embedding a watermark in each of the plurality of color channels by changing the numerical value acquired by the numerical value acquisition means.

Further, an information storage medium according to one embodiment of the present invention is a computer-readable information storage medium having the above-mentioned program stored thereon.

Further, in one aspect of the present invention, the image processing device further includes: histogram generation means for generating a histogram for each of the plurality of color channels based on the numerical values acquired by the numerical value acquisition means; and color channel selection means for selecting, out of the plurality of color channels, a color channel whose color distribution of the histogram generated by the histogram generation means is sparse, and the image processing means is configured to embed the watermark in the color channel selected by the color channel selection means out of the plurality of color channels.

Further, in one aspect of the present invention, the color image contains a red channel, a green channel, and a blue channel, and the image processing means includes determination means for determining whether a region of the color image in which the watermark is to be embedded is whitish, and the watermarks are embedded in only the red channel and the blue channel when the region is determined to be whitish, and watermarks are embedded in all the plurality of the color channels when the region is determined to be non-whitish.

Further, in one aspect of the present invention, the image processing means is configured to embed watermarks so that a part or all of the watermarks in the respective plurality of color channels overlap one another.

Further, in one aspect of the present invention, the image processing device further includes request reception means for receiving a request for the image data by a user, the watermark contains information for identifying the user requesting the image data, and the image processing device further includes image provision means for providing the image data which has the watermark is embedded by the image processing means to the user who has made the request that is received by the request reception means.

Further, in one aspect of the present invention, the image processing means is configured to change directions of watermarks to be embedded in the respective plurality of color channels so that the directions are different from one another.

Further, in one aspect of the present invention, the image processing means is configured to change sizes of watermarks to be embedded in the respective plurality of color channels so that the sizes are different from one another.

Further, in one aspect of the present invention, the image processing means is configured to change amounts of numerical values when watermarks are to be embedded in the respective plurality of color channels so that the change amounts are different from one another.

Advantageous Effects of Invention

According to one embodiment of the present invention, it is possible to increase certainty of the detection of a watermark embedded in a color image.

DESCRIPTION OF EMBODIMENTS

1. Hardware Configuration of Image Processing System

Figure 1:
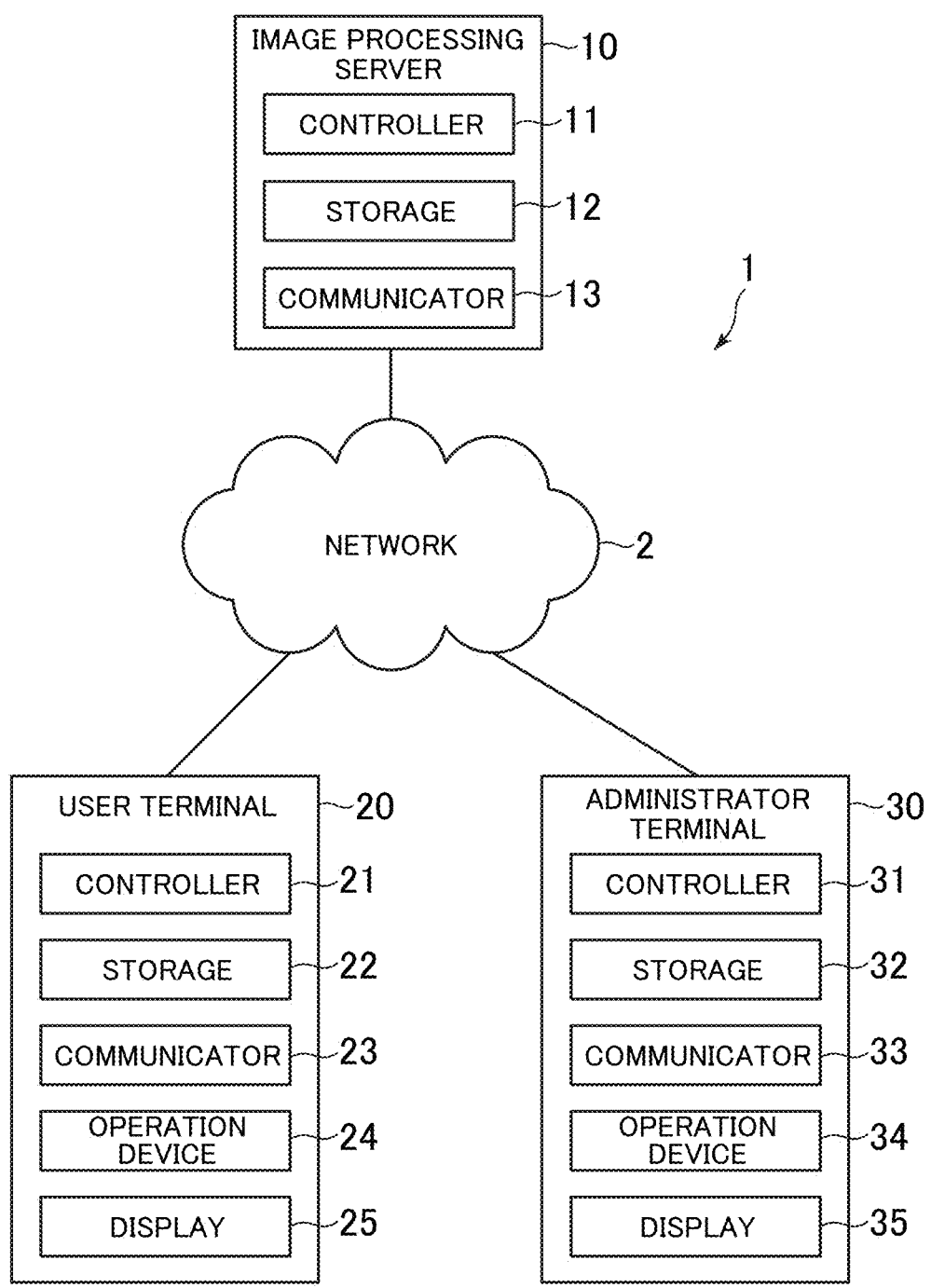
FIG. 1 is a diagram for illustrating an overall configuration of an image processing system in an embodiment of the present invention.

A description is now given of an image processing system including an image processing device according to an exemplary embodiment of the present invention. FIG. 1 is a diagram for illustrating an overall configuration of the image processing system in this embodiment. As illustrated in FIG. 1, the image processing system 1 includes an image processing server 10 (an example of the image processing device), a user terminal 20, and an administrator terminal 30. The image processing server 10, the user terminal 20, and the administrator terminal 30 are connected to one another so as to transmit/receive data to/from one another via a network 2. A description is herein given while assuming that the number of each of the image processing server 10, the user terminal 20, and the administrator terminal 30 is one, but the number of each thereof may be two or more.

The image processing server 10 is a server computer. The image processing server 10 includes a controller 11, a storage 12, and a communicator 13. The controller 11 includes, for example, one or more microprocessors. The controller 11 is configured to carry out processing in accordance with programs and data stored in the storage 12. The storage 12 includes a main storage and an auxiliary storage. For example, the main storage is a RAM, and the auxiliary storage is a hard disk drive, a solid state drive, or the like. The communicator 13 includes a network card. The communicator 13 is configured to carry out data communication via the network 2.

The user terminal 20 is a computer to be operated by a user, and is, for example, a personal computer, a cellular phone (including a smartphone), or a personal digital assistant (including a tablet computer). The user terminal 20 includes a controller 21, a storage 22, a communicator 23, an operation device 24, and a display 25. Hardware configurations of the controller 21, the storage 22, and the communicator 23 are the same as those of the controller 11, the storage 12, and the communicator 13, respectively, and a description thereof is therefore omitted.

The operation device 24 is an input device to be operated by the user, and is, for example, a mouse, a keyboard, and a touch panel. The operation device 24 is configured to transmit details of an operation by the user to the controller 21. The display 25 is, for example, a liquid crystal display or an organic EL display. The display 25 is configured to display a screen in accordance with an instruction of the controller 21.

The administrator terminal 30 is a computer to be operated by an administrator, and is, for example, a personal computer, a cellular phone (including a smartphone), or a personal digital assistant (including a tablet computer). Hardware configurations of a controller 31, a storage 32, a communicator 33, an operation device 34, and a display 35 of the administrator terminal 30 are the same as those of the controller 21, the storage 22, the communicator 23, the operation device 24, and the display 25, respectively, and a description thereof is therefore omitted.

Programs and data described as being stored in the storages 12, 22, and 32 may be supplied to the storages 12, 22, and 32 via the network 2. Moreover, the hardware configurations of the image processing server 10, the user terminal 20, and the administrator terminal 30 are not limited to the above-mentioned examples, and hardware of various computers can be applied thereto. For example, each of the image processing server 10, the user terminal 20, and the administrator terminal 30 may include a reader (for example, an optical disc drive and a memory card slot) configured to read a computer-readable information storage medium. In this case, programs and data stored in an information storage medium may be supplied to the storages 12, 22, and 32 via the reader.

In this embodiment, the image processing server 10 manages images of confidential information on a company for which the user works. For example, the image processing server 10 embeds watermarks in a color image requested by a user so as to allow identification of the user when the user intentionally discloses the image to the outside of the company. On this occasion, the image processing server 10 embeds the watermark in each of a plurality of color channels, to thereby increase certainty of detection of the watermarks. A detailed description is now given of this technology.

2. Functions to be Implemented in Image Processing System

Figure 2:
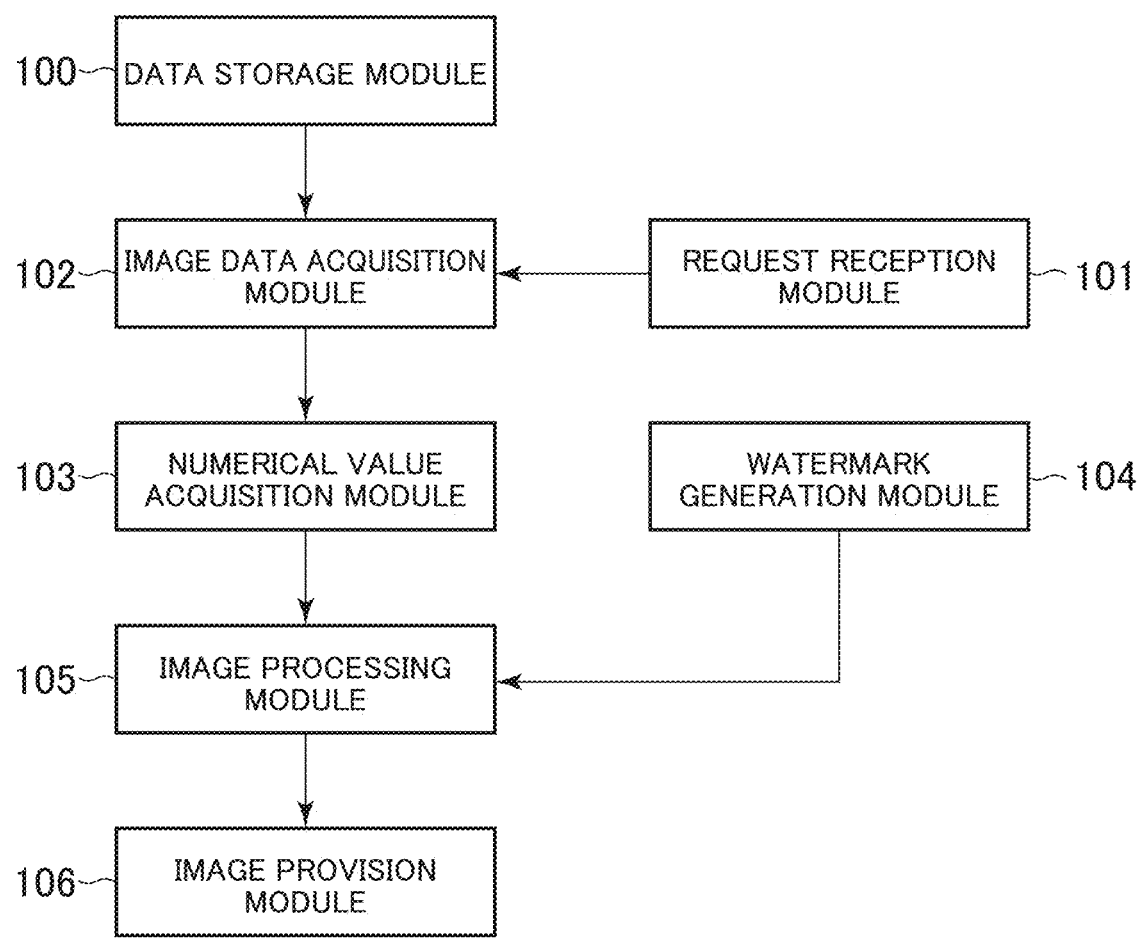
FIG. 2 is a functional block diagram for illustrating an example of functions to be implemented by the image processing system.

FIG. 2 is a functional block diagram for illustrating an example of functions to be implemented in the image processing system 1. In this embodiment, a description is mainly given of functions to be implemented in the image processing server 10. As illustrated in FIG. 2, a data storage module 100, a request reception module 101, an image data acquisition module 102, a numerical value acquisition module 103, a watermark generation module 104, an image processing module 105, and an image provision module 106 are implemented in the image processing server 10.

[2-1. Data Storage Module]

The data storage module 100 is implemented mainly by the storage 12. The data storage module 100 is configured to store various types of data for embedding watermarks in a color image. For example, the data storage module 100 stores a user database and an image database.

The user database stores information on users who use the image processing system 1. For example, the user database stores user IDs (for example, employee numbers) each for uniquely identifying a user, and private information on users. The private information includes, for example, a user name (for example, a name and a user account), an assigned section of the user (for example, a company name and a department to which the user belongs), and contact information of the user (for example, a phone number and an email address).

The image database stores information on image data managed by the image processing server 10. The image data may be still image data or moving image data. In this embodiment, a description is given of a case in which the image data indicate color still images as an example.

The image data itself or only locations of the image data may be stored in the in the image database. The location of the image data is a storage location of the image data, and is, for example, link information such as a folder (directory) or a URL at which the image data is stored. The image data may be stored in the image processing server 10, or may be stored in another computer connected to the image processing server 10 so that the data can be transmitted/received to/from the image processing server 10. Moreover, a type and a data size of the image data may be stored in the image database. The type of the image data is, for example, an extension of the image data and color depth information.

The data stored in the data storage module 100 is not limited to the above-mentioned example. The data storage module 100 may store various types of data. For example, when information on an creator and administrator of the image data is contained in the watermark, the data storage module 100 may store the information on the creator and the administrator for each piece of the image data.

[2-2. Request Reception Module]

The request reception module 101 is implemented mainly by the controller 11. The request reception module 101 is configured to receive a request for image data by the user. The request for image data is an acquisition request or a display request for the image data. For example, the request reception module 101 receives information (file name, link information, and the like) for identifying image data specified by the user from the user terminal 20, to thereby receive the request for the image data.

[2-3. Image Data Acquisition Module]

The image data acquisition module 102 is implemented mainly by the controller 11. The image date acquisition module 102 is configured to acquire image data on a color image having a plurality of color channels. In this embodiment, the user requests the image data stored in the image database, and the image data acquisition module 102 thus acquires the image data specified by the user out of the plurality of pieces of image data stored in the image database.

[2-4. Numerical Value Acquisition Module]

The numerical value acquisition module 103 is implemented mainly by the controller 11. The numerical value acquisition module 103 is configured to acquire respective numerical values in the plurality of color channels contained in a pixel value of the color image based on the image data acquired by the image data acquisition module 102. The pixel value of each of pixels of the color image contains a numerical value for each of the channels. For example, the pixel value of an RGB color image contains a numerical value in a red channel, a numerical value in a green channel, and a numerical value in a blue channel. When the RGB color image has a 24-bit configuration, the numerical value of each of the color channels is represented in 8 bits, and thus takes a numerical value of from 0 to 255. The numerical value acquisition module 103 refers to the pixel value of each of the pixels of the image data, to thereby acquire the numerical values in the respective color channels constructing the pixel value.

[2-5. Watermark Generation Module]

The watermark generation module 104 is implemented mainly by the controller 11. The watermark generation module 104 is configured to generate watermarks. The watermark is also referred to as digital watermark, and is generally an image embedded in order to maintain confidentiality of data and protect copyright of data. Visible and invisible watermarks exist, but, in this embodiment, a description is given of a case in which the watermark is invisible.

The watermark contains information on the color image stored in the image database. In other words, the watermark contains information on the color image in which the watermark itself is to be embedded. This information is information for maintaining the confidentiality of the color image and protecting the copyright of the color image, and is, for example, information for identifying the user who has requested the color image, information for identifying the creator of the color image, and information for identifying the administrator of the color image. In the following, a description is given of a case in which the watermark contains information for identifying a user who has requested the image data. The information for identifying the user is the information stored in the user database, and is, for example, the user ID, the user name, the assigned section, and the contact information.

Moreover, the watermark may be indicated as an image or a text. In this embodiment, a description is given of a case in which the watermark is indicated as an image. Further, as an example of the image, a description is given of a case in which a code defined by a given standard is used. The code may be a barcode or a 2D code. In the following, a description is given of a case in which a 2D code is used as the watermark, and the description is given of a QR code (trademark) as an example of the 2D code.

[2-6. Image Processing Module]

The image processing module 105 is implemented mainly by the controller 11. The image processing module 105 is configured to embed a watermark in each of the plurality of color channels by changing the numerical value acquired by the numerical value acquisition module 103.

Figure 3:
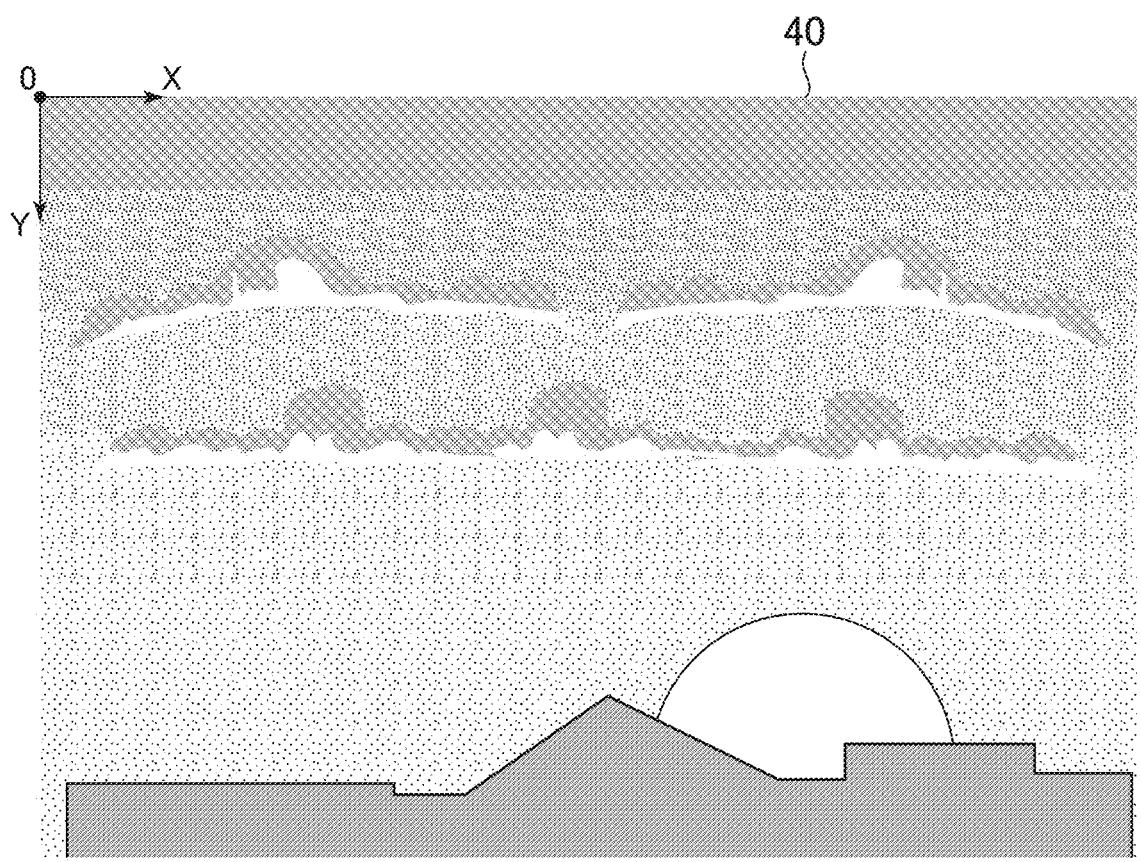
FIG. 3 is a diagram for illustrating a color image before watermarks are embedded.

Referring to FIG. 3 to FIG. 7, a description is now given of processing to be carried out by the image processing module 105. FIG. 3 is a diagram for illustrating a color image before the watermarks are embedded. In FIG. 3, an upper left corner of a color image 40 is set to an origin O of a screen coordinate system (X-Y coordinate system). As described above, the pixel value of each of pixels of the color image 40 contains a numerical value $R_{xy}$ in the red channel, a numerical value $G_{xy}$ in the green channel, and a numerical value $B_{xy}$ in the blue channel. The characters x and y indicate the coordinates of the pixel. The image processing module 105 changes the numerical values in the color channels in which the watermarks are to be embedded out of those three numerical values $R_{xy}$, $G_{xy}$, and $B_{xy}$, to thereby embed watermarks 50 in the color image 40.

Figure 4:
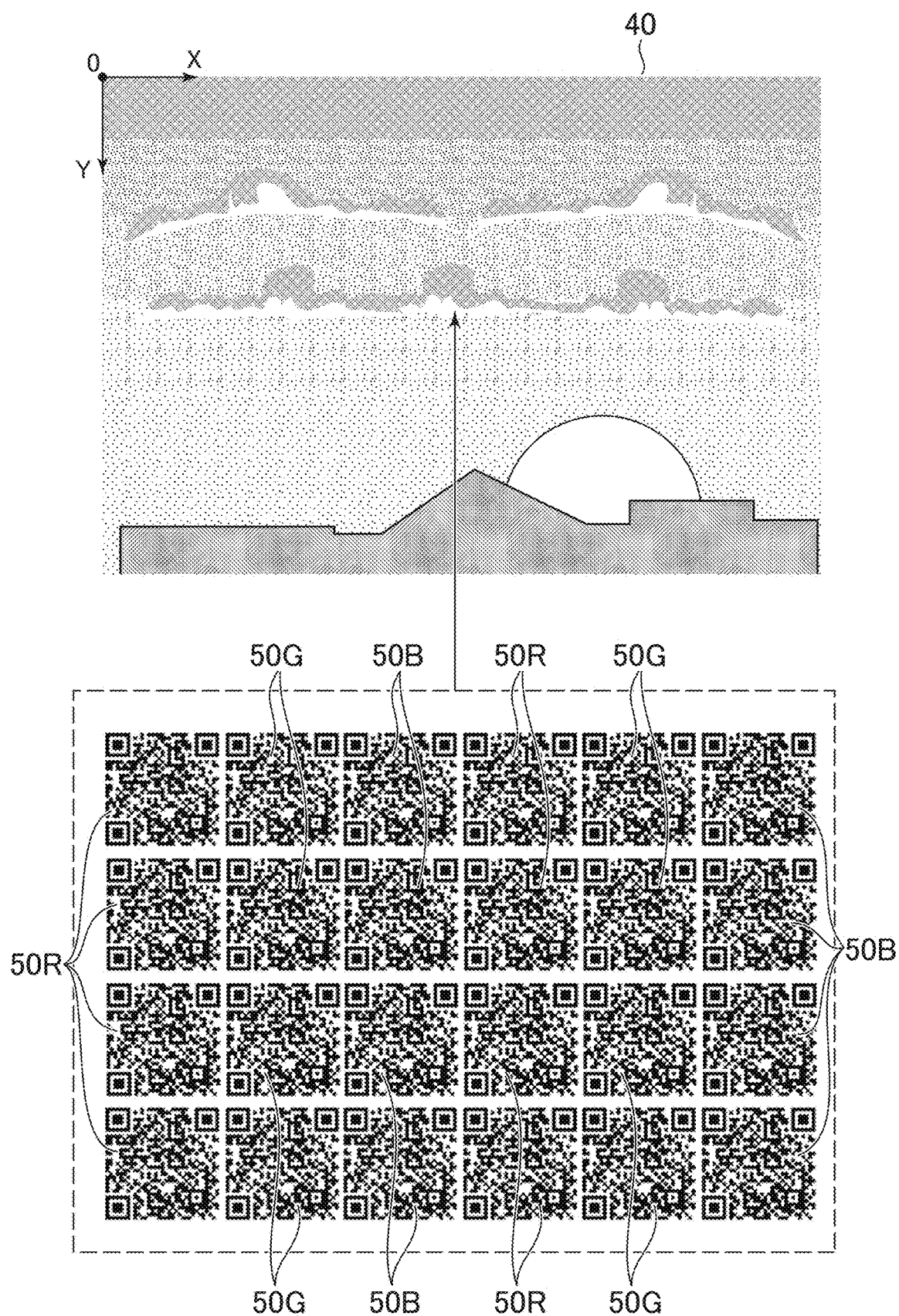
FIG. 4 is a diagram for illustrating how the watermarks are embedded.

FIG. 4 is a diagram for illustrating how the watermarks are embedded. Watermarks 50R of FIG. 4 indicate watermarks to be embedded in the red channel. Similarly, the watermarks 50G and 50B indicate watermarks to be embedded in the green channel and the blue channel, respectively. When the three watermarks 50R, 50G, and 50G are not particularly distinguished from one another, those watermarks are hereinafter simply referred to as watermarks 50. Moreover, when it is not required to refer to the drawings, reference numerals of color images and watermarks are omitted.

In the example illustrated in FIG. 4, the image processing module 105 embeds the watermarks 50R, 50G, and 50B in the stated order from the left of the color image 40. In other words, the image processing module 105 sequentially embeds eight watermarks for each of the watermarks 50R, 50G, and 50B. The image processing module 105 is only required to select positions to embed the watermarks 50 based on a predetermined method, and may determine the positions to embed the watermarks 50 not in the order illustrated as in FIG. 4, but randomly. Moreover, in FIG. 4, the watermarks 50R, 50G, and 50B are arranged so as not to overlap one another for the sake of simplicity, but the watermarks 50R, 50G, and 50B may overlap one another as described in a modification example of the present invention described later.

As described above, in this embodiment, the watermark 50 is a 2D code. Each of cells of the 2D code takes any one of values of 0 and 1. For example, a cell corresponding to "0" does not have a color, and a cell corresponding to "1" has a color. Herein, not having a color means having the same color as a background color, and having a color means having a color different from the background color. In other words, a region corresponding to a cell of "0" of the watermark 50R to be embedded in the red channel does not have a color of red, and a region corresponding to a cell of "1" has the color of red. Similarly, a region corresponding to a cell of "0" of each of the watermarks 50G and 50B does not have a color of green or a color of blue, and a region corresponding to a cell of "1" has the color of green or the color of blue. Therefore, in FIG. 4, the watermarks 50R, 50G, and 50B are illustrated in the same color, but actually have the color of red, the color of green, and the color of blue, respectively. One cell of the 2D code of the watermark 50 may be constructed of one pixel or a plurality of pixels of the image. For example, when a watermark 50 large enough to withstand image compression is employed, one cell is only required to be constructed of a plurality of pixels.

For example, the image processing module 105 does not change the pixel value of the pixel corresponding to the cell of "0" of the watermark 50, and changes the pixel value of the pixel corresponding to the cell of "1" of the watermark 50. Specifically, the image processing module 105 does not change a pixel value ($R_{xy}$, $G_{xy}$, $B_{xy}$) of a pixel $P_{xy}$ corresponding to the cell of "0" of the watermark 50R, and changes to ($R_{xy}$+1, $G_{xy}$, $B_{xy}$) the pixel value of a pixel $P_{xy}$ corresponding to the cell of "1" of the watermark 50R. Similarly, the image processing module 105 does not change the pixel values ($R_{xy}$, $G_{xy}$, $B_{xy}$) of pixels $P_{xy}$ corresponding to the cells of "0" of the watermark 50G and the watermark 50B, and changes to ($R_{xy}$, $G_{xy}$+1, $B_{xy}$) and ($R_{xy}$, $G_{xy}$, $B_{xy}$+1) the pixel values of pixels $P_{xy}$ corresponding to the cell of "1" of the watermark 50G or the watermark 50B, respectively. Thus, the pixel values of the region in which the watermark 50 is embedded only slightly change, and hence, as illustrated in FIG. 4, the watermark 50 is in a state in which the watermark 50 is less likely to be noticeable with the human eyes (invisible state).

Figure 5:
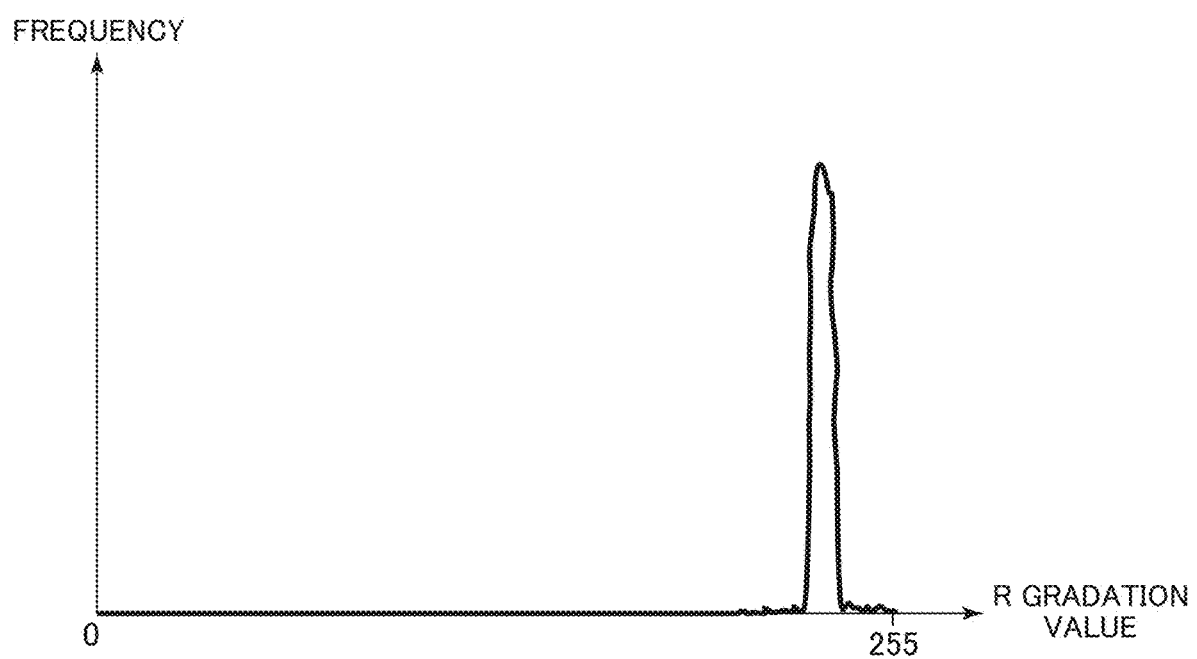
FIG. 5 is a graph for showing, for each of color channels, a histogram of the color image before the watermarks are embedded.
Figure 6:
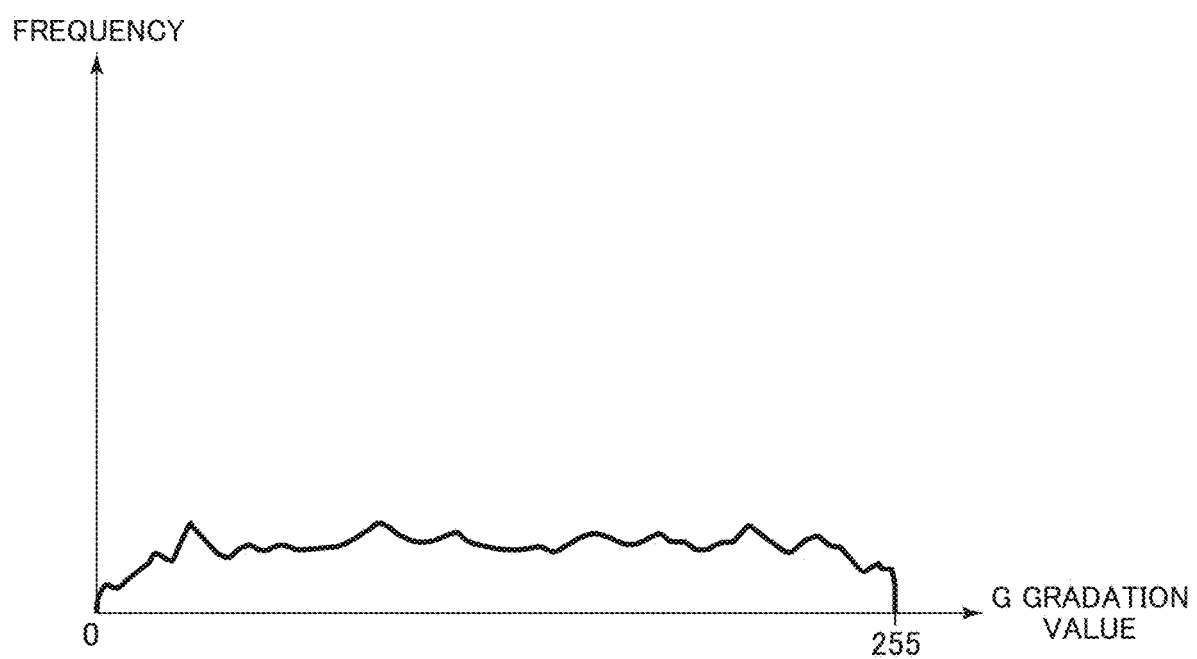
FIG. 6 is a graph for showing, for each of color channels, a histogram of the color image before the watermarks are embedded.
Figure 7:
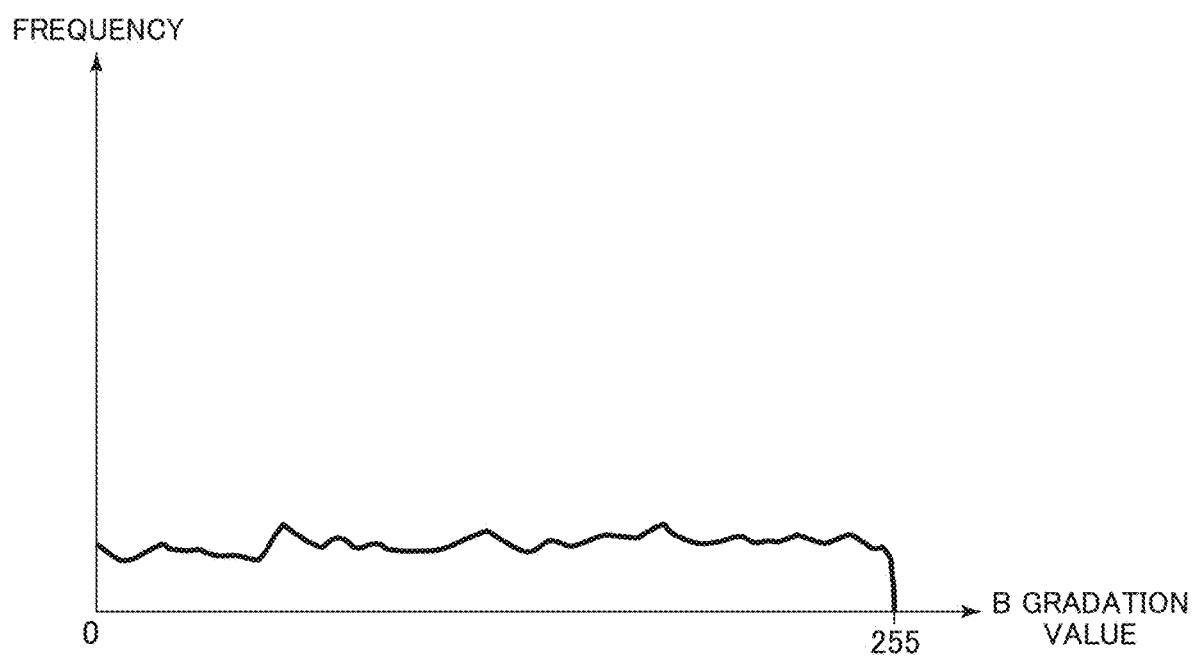
FIG. 7 is a graph for showing, for each of color channels, a histogram of the color image before the watermarks are embedded.

The watermark 50 embedded as described above can be detected by, for example, extracting a predetermined characteristic from a histogram of the color image 40. However, as described above, when the watermark 50 is embedded in a region presenting a gradation, it may be difficult to detect the watermark 50. FIG. 5 to FIG. 7 are graphs for showing, for the respective color channels, histograms of the color image 40 before the watermarks 50 are embedded. The color image 40 is a photograph acquired by taking sunset, and has a red tone as a whole. Therefore, as shown in FIG. 5, a frequency is concentrated in specific gradation values out of gradation values in the red channel. As shown in FIG. 6 and FIG. 7, frequencies are uniformly distributed to the respective gradation values in the green channel and the blue channel. In other words, while a component in the red channel does not present a remarkable gradation, and it is thus easy to detect the watermarks 50R, components in the green channel and the blue channel present gradations, and it is thus difficult to detect the watermarks 50G and 50B. In this respect, the image processing module 105 embeds the watermark 50 in each of the plurality of color channels, and even when it is difficult to detect the watermarks 50G and 50B in the green channel and the blue channel, it is easy to detect the watermarks 50R in the red channel.

A description has been given of the case in which the image processing module 105 increases the numerical values $R_{xy}$, $G_{xy}$, and $B_{xy}$ in the respective color channels by one, but the image processing module 105 may change the numerical values by two or more. When the changes in the numerical values $R_{xy}$, $G_{xy}$, and $B_{xy}$ are too large, the invisibility may not be maintained, and the change amounts may thus be less than a threshold (for example, four). Moreover, instead of increasing the numerical values, the image processing module 105 may decrease the numerical values $R_{xy}$, $G_{xy}$, and $B_{xy}$ in the respective color channels. In this case, the image processing module 105 may decrease the pixel value of the pixel corresponding to the cell of "0" of the watermark 50, and does not change the pixel value of the pixel corresponding to the cell of "1" of the watermark 50. Moreover, the change amount of the numerical values $R_{xy}$, $G_{xy}$, and $B_{xy}$ in the respective color channels may be a fixed value or a variable value.

Moreover, the number of watermarks 50 to be embedded in each of the color channels may not be plural, but may be one. The number of the watermarks 50 may be the same for all the pieces of image data stored in the image database, or may be different for each piece of the image data. Further, the number of the watermarks 50 may be a fixed value or a variable value. When the number of the watermarks 50 is a variable value, the number of the watermarks 50 may be determined under a certain condition such as the user or the image data, or may be randomly determined.

[2-7. Image Provision Module]

The image provision module 106 is implemented mainly by the controller 11. The image provision module 106 is configured to provide image data (namely, image data having changed pixel values) which has the watermarks are embedded by the image processing module 105 to the user from which the request is received by the request reception module 101. For example, the image provision module 106 may transmit the image data itself in which the watermarks are embedded to the user terminal 20, or without transmitting the image data itself, transmit only data (display data for a screen) for displaying the color image on the display 25 to the user terminal 20.

3. Processing to be Carried Out in Image Processing System

A description is now given of watermark embedment processing of embedding watermarks in a color image and watermark detection processing of detecting watermarks embedded in a color image as examples of processing to be carried out in the image processing system 1. The processing described below is an example of processing to be carried out by the functional blocks illustrated in FIG. 2.

Figure 8:
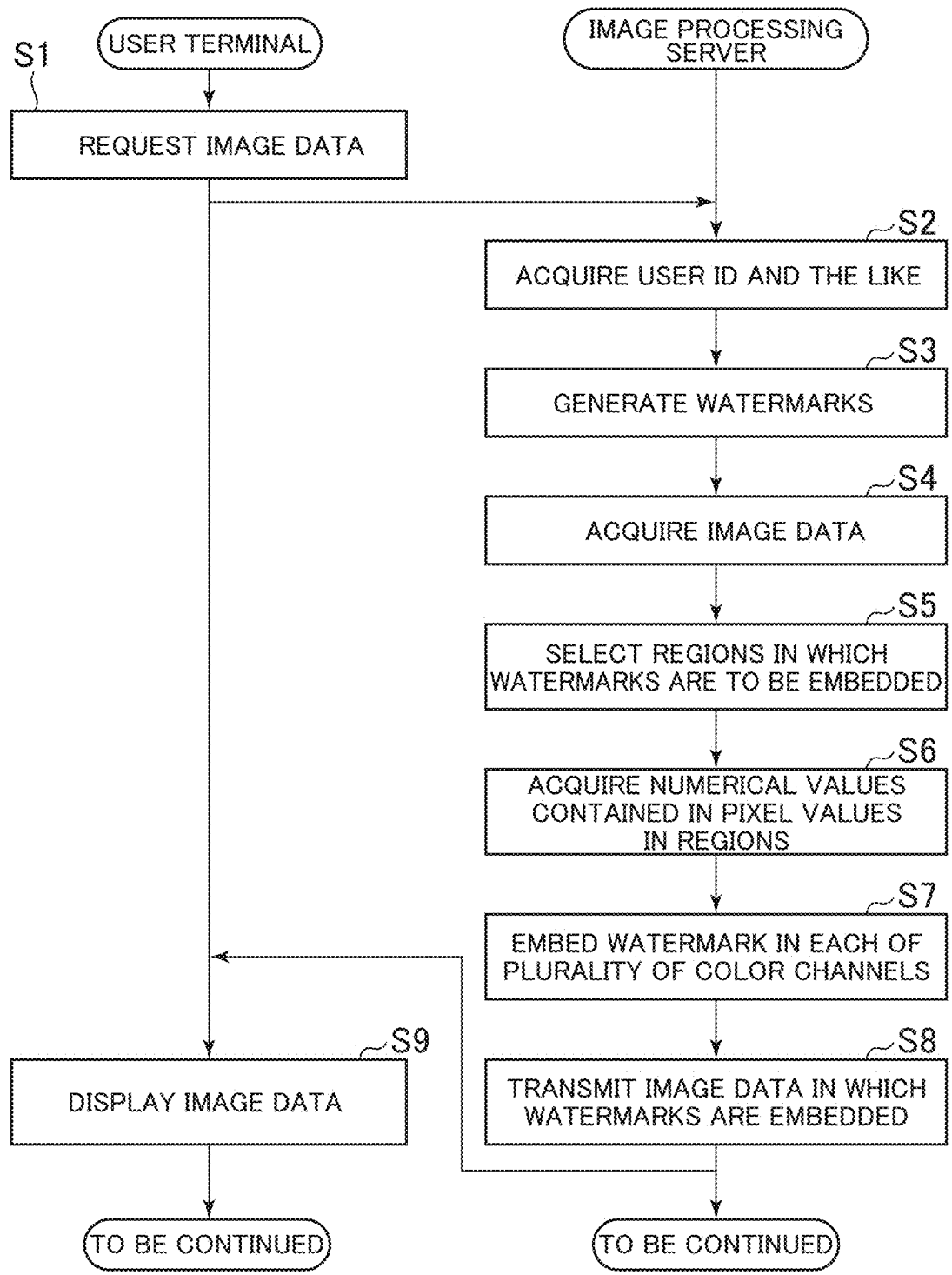
FIG. 8 is a flowchart for illustrating an example of watermark embedment processing.

FIG. 8 is a flowchart for illustrating an example of the watermark embedment processing. The processing illustrated in FIG. 8 is carried out by the controller 11 operating in accordance with the program stored in the storage 12, and the controller 21 operating in accordance with the program stored in the storage 22.

As illustrated in FIG. 8, first, when the user carries out a predetermined operation from the operation device 24 in the user terminal 20, the controller 21 requests image data from the image processing server 10 (Step S1). The request for the image data is only required to be carried out in a predetermined form, and contains, for example, information (file name, link information, and the like) for identifying the requested image data. When the request is transmitted from the user terminal 20 to the image processing server 10, it is assumed that a user ID and an IP address are transmitted, and the image processing server 10 can thus identify which user is making the access.

When the request for the image data is received in the image processing server 10, the controller 11 refers to the user database, and acquires information including the user ID of the user who has requested the image data (Step S2). In Step S2, the controller 11 acquires information to be embedded as the watermarks based on the request for the image data. This information may contain a time and date of the request for the image data by the user, and a time and date of provision of the image data to the user.

The controller 11 generates the watermarks based on the information acquired in Step S2 (Step S3). It is assumed that a program for generating the watermarks is stored in the storage 12. In this embodiment, the 2D code is used as the watermark, and a publicly-known 2D code builder may thus be used. In Step S3, the controller 11 inputs the information acquired in Step S2 into the 2D code builder, to thereby generate the watermarks.

The controller 11 refers to the image database, to thereby acquire the image data requested by the user (Step S4). The controller 11 selects regions in which the watermarks generated in Step S3 are to be embedded out of regions of a color image indicated by the image data (Step S5). In Step S5, the controller 11 selects the regions in which the watermarks are to be embedded in each of the red channel, the green channel, and the blue channel. For example, when the watermarks are to be embedded as illustrated in FIG. 4, the controller 11 selects the regions in the order of the red channel, the green channel, and the blue channel from the left of the color image.

The controller 11 acquires the numerical values $R_{xy}$, $G_{xy}$, and $B_{xy}$ in the respective color channels contained in the pixel values in the regions selected in Step S5 (Step S6). The controller 11 changes the numerical values $R_{xy}$, $G_{xy}$, and $B_{xy}$ acquired in Step S6, to thereby embed the watermarks generated in Step S3 in the plurality of color channels (Step S7). In Step S7, the controller 11 changes the numerical values $R_{xy}$, $G_{xy}$, and $B_{xy}$ in the regions in which the watermarks are to be embedded based on the method described with reference to FIG. 3 to FIG. 7. The controller 11 transmits the image data in which the watermarks are embedded in Step S6 to the user terminal 20 (Step S8). When the image data is received in the user terminal 20, the controller 21 displays the received image data on the display 25 (Step S9), and the processing is finished.

When the watermark embedment processing described above is carried out, the user is brought into a state in which the user can upload the received image data, a screen shot of the display 25, and the like to a computer on the network 2. The watermark detection processing described below is processing of detecting the watermarks embedded in the color image uploaded to the computer on the network 2 in the administrator terminal 30.

Figure 9:
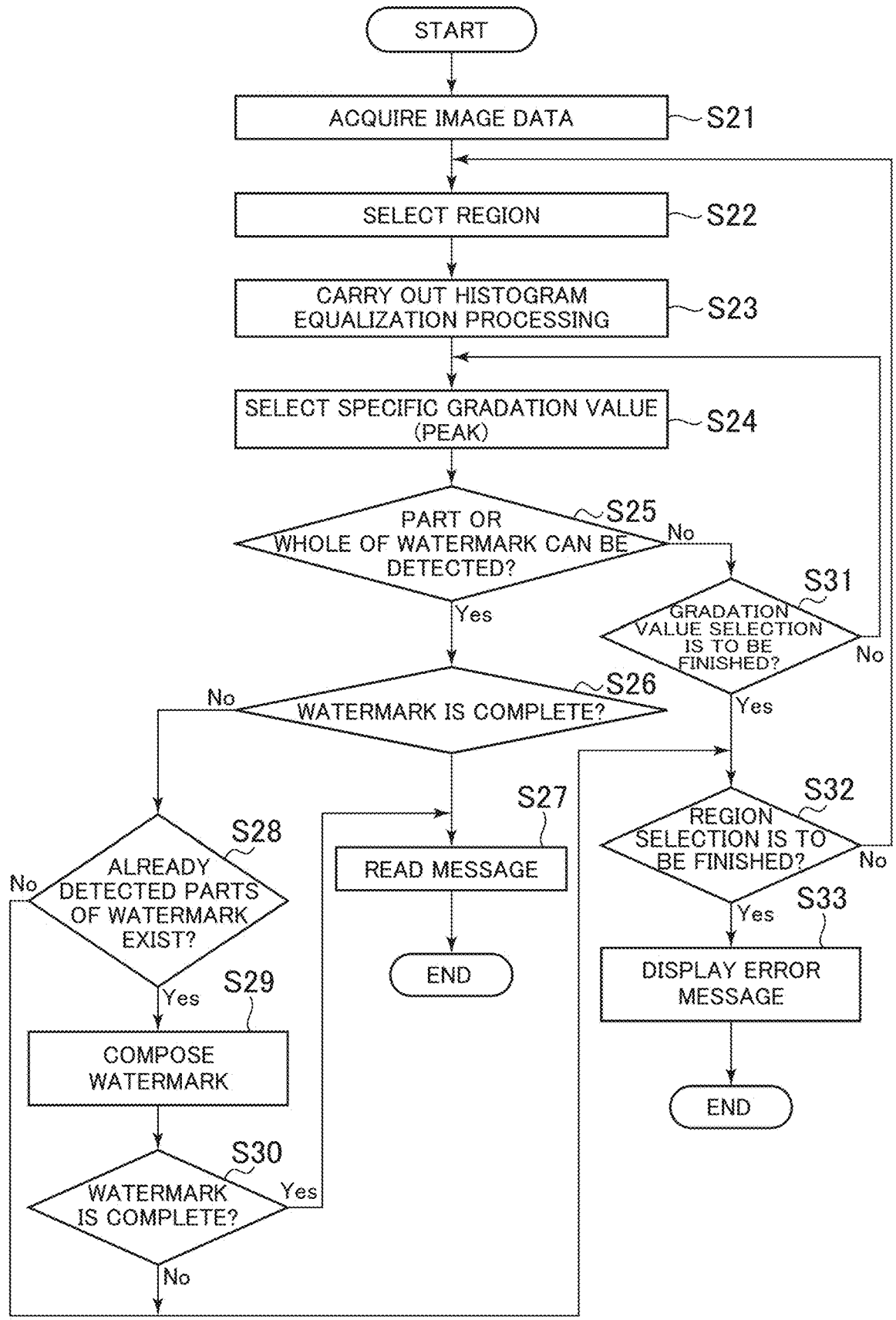
FIG. 9 is a flowchart for illustrating an example of watermark detection processing.

FIG. 9 is a flowchart for illustrating an example of the watermark detection processing. The processing illustrated in FIG. 9 is carried out by the controller 31 operating in accordance with a program stored in the storage 32. As illustrated in FIG. 9, first, the controller 31 acquires the image data disclosed on the computer on the network 2 (Step S21). In Step S21, the controller 31 may receive the image data from the computer on the network 2, or may read out the image data downloaded to the storage module 32 in advance.

The controller 31 selects a region in the color image indicated by the image data acquired in Step S21 (Step S22). In Step S22, the controller 31 is only required to select the region in the color image based on a predetermined method, and may sequentially select a region having a predetermined size from a predetermined position in the image, or may randomly select a region. The processing starting from Step S22 is carried out in each of the color channels. In other words, the controller 31 carries out processing from Step S22 to Step S33 in the red channel, carries out processing from Step S22 to Step S33 in the green channel, and carries out processing from Step S22 to Step S33 in the blue channel.

The controller 31 carries out, in each of the color channels, histogram equalization processing for the region selected in Step S22 (Step S23). The histogram equalization processing is processing of converting respective pixel values so that a graph indicating a cumulative value of the frequency in the histogram becomes linear. Even when an uneven distribution exists in the gradation value, an even distribution in the gradation value can be achieved by applying the histogram equalization processing to the color image. As the histogram equalization processing itself, publicly-known various types of processing can be applied. In Step S23, the controller 31 carries out the histogram equalization processing in each of the color channels, and thus generates three histograms in the red channel, the green channel, and the blue channel. The histogram equalization processing may be applied to the entire image, but through application of the histogram equalization processing to a part of the regions, distances between peaks in each of the gradation values can be increased, and hence the watermarks tend to appear more remarkable. Consequently, the watermarks can be detected more easily.

The controller 31 refers to the histograms generated in Step S23, to thereby select a specific gradation value (or a peak) (Step S24). In Step S24, the controller 31 compares frequencies appearing in the histogram with a threshold, and selects a gradation value at which the frequency equal to or more than a reference appears. This threshold is assumed to be stored in the storage 32.

The controller 31 determines whether or not a part or all of the watermark can be detected at the gradation value selected in Step S24 in any one of the color channels (Step S25). In Step S25, the controller 31 determines whether or not predetermined patterns contained in the watermark are detected. When the 2D code is used as the watermark as in this embodiment, the controller 31 searches for the three finder patterns arranged at corners of the 2D code. For example, when one or two finder patterns are detected, the controller 31 determines that a part of the watermark is detected, and when the three finder patterns are detected, the controller 31 determines that all of the watermark is detected.

When it is determined that a part or all of the watermark can be detected (Y in Step S25), the controller 31 determines whether or not the detected watermark is complete (Step S26). When the watermarks are detected in a plurality of color channels in Step S25, the processing in Step S26 is carried out in each of the plurality of color channels. Moreover, when the 2D code is used as the watermark as in this embodiment, in Step S26, the controller 31 is only required to determine whether or not the watermark can be read by a publicly-known 2D code reader. Moreover, for example, the controller 31 may determine whether or not predetermined patterns contained in the watermarks have been detected. The pattern may be the same as or different from the pattern used in the determination in Step S25. In Step S26, the controller 31 may determine whether or not the alignment pattern, the timing pattern, or format information has been detected through use of the pattern matching.

When it is determined that the watermark is complete (Y in Step S26), the controller 31 reads a message contained in the watermark, and displays the message on the display 35 (Step S27), and the processing is finished. In Step S27, the controller 31 displays on the display 35 the information contained in the watermark, for example, the user ID.

On the other hand, when it is determined that the watermark is not complete (N in Step S26), the controller 31 refers to the storage 32, and determines whether or not parts of the watermark that have already been detected exist (Step S28). It is assumed that parts of the watermark that were previously detected in Step S25 are stored in the storage 32.

When it is determined that parts of the watermark exist (Y in Step S28), the controller 31 composes the part of the watermark detected in Step S25 and the parts of the watermark that have already been detected (Step S29). In Step S29, the controller 31 arranges predetermined patterns contained in each of the parts of the watermarks at predetermined positions, to thereby compose the watermark. For example, when the 2D code is used as the watermark as in this embodiment, the finder patterns are arranged at the three corners, and the finder patterns contained in the respective parts of the watermark are thus arranged at the corners. In Step S29, the controller 31 may compose a part of the watermark detected in one color channel and a part of the watermark detected in another color channel.

The controller 31 determines whether or not the watermark composed in Step S29 is complete (Step S30). The processing in Step S30 is the same as that in Step S26. When the watermark is determined to be complete (Y in Step S30), in Step S27, the message is read out, and the processing is finished. On the other hand, when the watermark is determined not to be complete (N in Step S30), the processing proceeds to Step S32.

When it is determined in Step S25 that a part or all of the watermark cannot be detected (N in Step S25), the controller 31 determines whether or not the selection of the gradation value in Step S24 is to be finished (Step S31). In Step S31, the controller 31 determines whether or not a gradation value that has not been selected yet exists. When it is determined that the selection of the gradation value is not to be finished (N in Step S31), the controller 31 returns to the processing in Step S24, and the detection processing for the watermark is carried out for a next gradation value.

On the other hand, when it is determined that the selection of the gradation value is to be finished (Y in Step S31), the controller 31 determines whether or not all regions have been selected in Step S22 (Step S32). When it is determined that a region that has not been selected exists (N in Step S32), the controller 32 returns to the processing in Step S22, and the detection processing for the watermark is carried out for a next region.

On the other hand, when it is determined that the selection of the region is to be finished (Y in Step S32), the controller 31 displays on the display 35 an error message indicating that the watermark has failed to be detected (Step S33), and the processing is finished.

With the above-mentioned image processing system 1, the image processing server 10 embeds the watermark in each of the plurality of color channels, and hence even when a part of color channels have such a tendency that it is difficult to detect the watermark, but another color channel has such a tendency that it is easy to detect the watermark, the watermark can be detected. As a result, the certainty of detecting the watermark can be increased. For example, even when the green channel and the blue channel present gradations as in the color image 40 of FIG. 3, when the red channel does not present a gradation, it is easy to detect the watermarks embedded in the red channel, and hence the certainty of detecting the watermark increases. Further, watermarks different from one another may be embedded in the respective color channels, and hence an amount of information to be embedded in the color image can be increased.

Moreover, the information for identifying the user who has requested the image data from the image processing server 10 is contained in the watermarks, and hence, for example, even when the user leaks an image that is confidential information on a company to the outside of the company, the user can be identified from the watermarks. As a result, the leakage of the image can be prevented beforehand.

4. Modification Examples

The present invention is not limited to the above-mentioned embodiment. The present invention may appropriately be modified without departing from the purport of the present invention.

Figure 10:
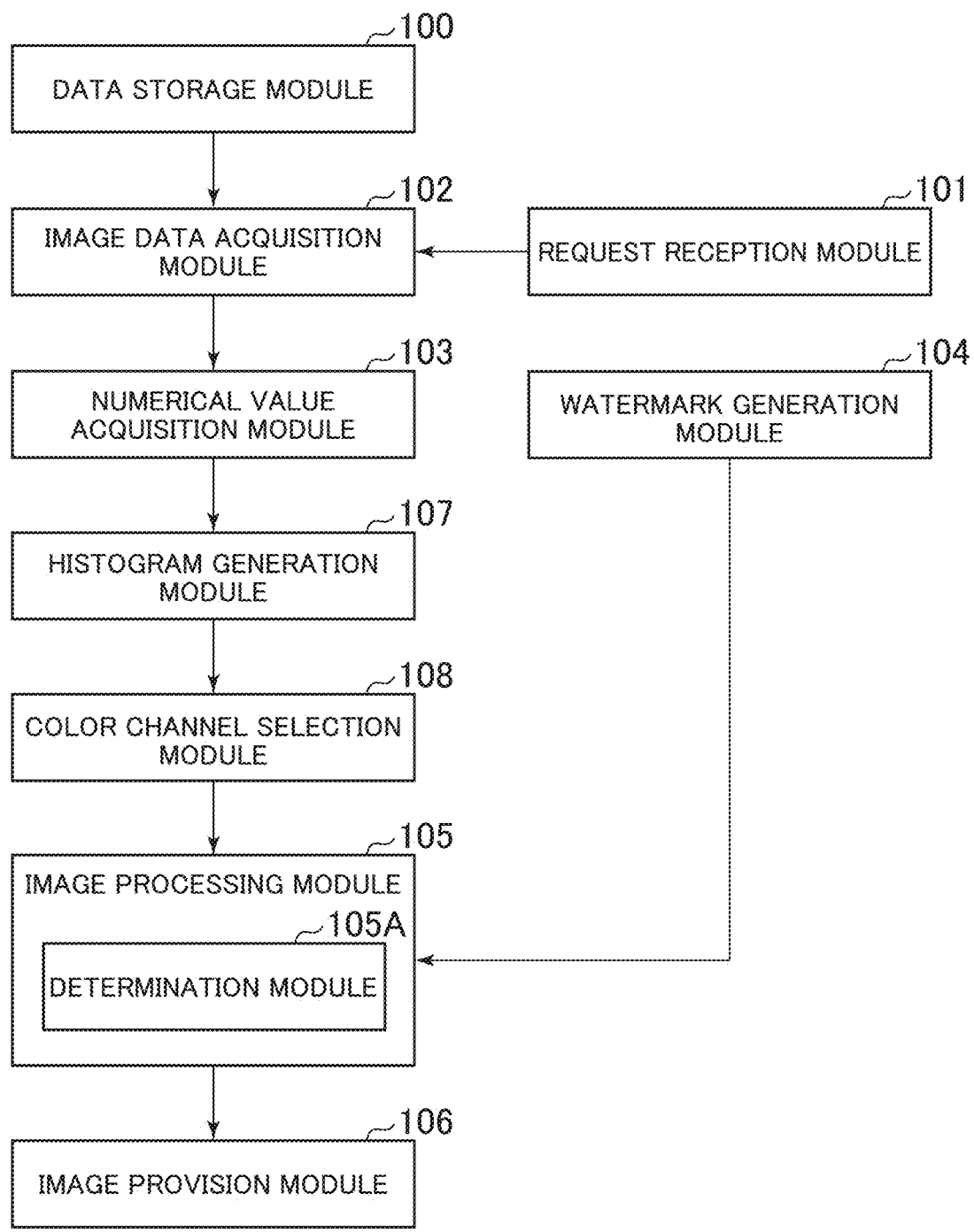
FIG. 10 is a functional block diagram for illustrating modification examples of the present invention.

FIG. 10 is a functional block diagram of modification examples of the present invention. As illustrated in FIG. 10, in the modification examples described below, in addition to the functions of the embodiment, a histogram generation module 107 and a color channel selection module 108 (refer to Modification Example (1) of the present invention) are implemented, and a determination module 105A (refer to Modification Example (2)) is implemented in the image processing module 105.

(1) For example, in the embodiment, a description has been given of the case in which the watermarks are embedded in all the color channels of the color image, but a color channel in which the watermark can easily be detected (color channel in which a gradation does not exist, and the color distribution is thus sparse) may be selected, and the watermarks may be embedded only in the selected color channel.

In the image processing system 1 in Modification Example (1), the histogram generation module 107 and the color channel selection module 108 are implemented. Both the histogram generation module 107 and the color channel selection module 108 are implemented mainly by the controller 11.

The histogram generation module 107 is configured to generate the histogram in each of the color channels based on the numerical values $R_{xy}$, $G_{xy}$, and $B_{xy}$ acquired by the numerical value acquisition module 103. The histogram generation module 107 may generate the histograms for the entire color image 40, or may generate the histograms only for a part of the regions. In the following, for the sake of a simple description, a description is given of the case in which the histograms are generated for the entire color image 40.

Publicly-known various methods can be applied to the generation method for the histograms, but the histogram generation module 107 generates the histograms, for example, as follows. The generation method for the histogram in the red channel is exemplified. In the case of a 24-bit color image, the numerical value $R_{xy}$ in the red channel is indicated as the gradation value on 256 levels of from 0 to 255, and the histogram generation module 107 refers to the numerical value $R_{xy}$ in the red channel of each of the pixels $P_{xy}$ of the color image 40 to count the frequency of the respective gradation values, to thereby generate the histogram in the red channel. The histogram generation module 107 counts the frequencies of the respective gradation values, to thereby generate the histograms also in the green channel and the blue channel in the same way.

Figure 11:
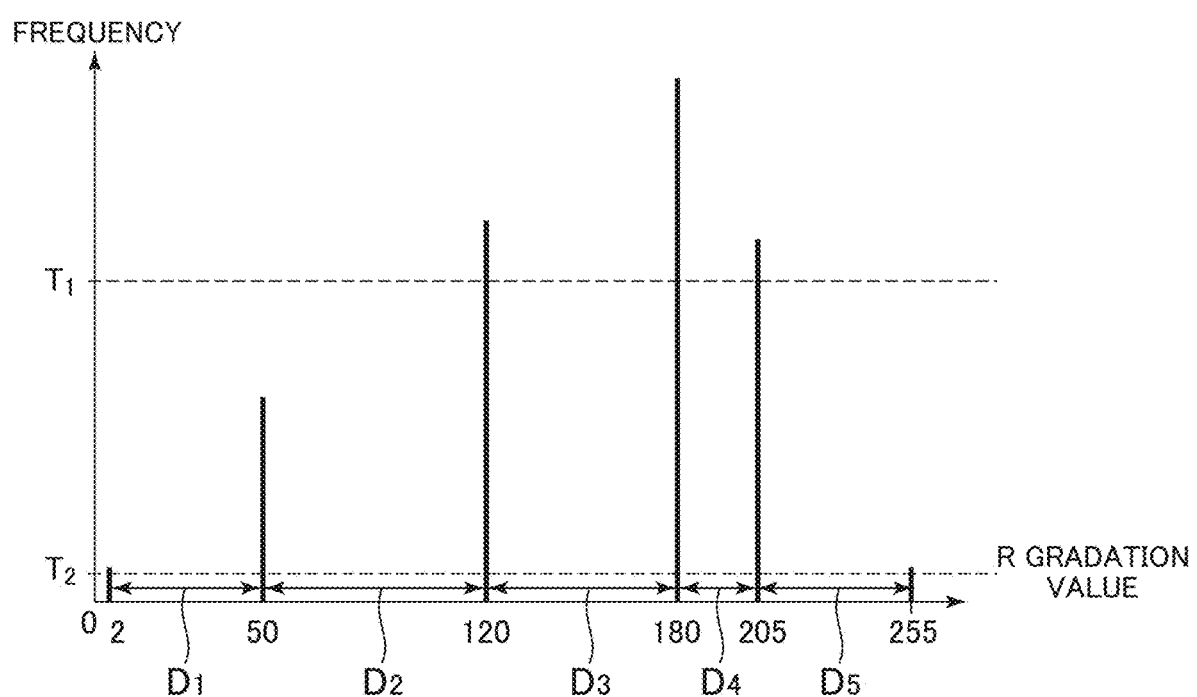
FIG. 11 is a graph for showing a histogram in a red channel.

In this case, in order to facilitate the determination of a degree of the sparseness of the color distribution, the histogram generation module 107 carries out the histogram equalization processing, and then generates the histogram of the color image 40. FIG. 11 is a diagram for illustrating the histogram in the red channel. For example, as shown in FIG. 5, in the red channel, the frequency is concentrated in a range of from 230 to 235, and the frequency is approximately 0 at the other gradation values. Thus, as illustrated in FIG. 11, a histogram having a sparse color distribution is acquired through the execution of the histogram equalization processing. On the other hand, as shown in FIG. 6 and FIG. 7, the frequency is distributed to the respective gradation values in the green channel and the blue channel, and hence even when the histogram equalization processing is carried out, the histograms hardly change from those of FIG. 6 and FIG. 7.

The color channel selection module 108 is configured to select, out of the plurality of color channels, a color channel whose color distribution in the histogram generated by the histogram generation module 107 is sparse. Being sparse in the color distribution means that a degree of sparseness (density) of gradation values at which a frequency equal to or more than a predetermined frequency appears is equal to more than a reference (equal to or more than a reference density). For example, it is determined whether or not the color distribution is sparse as follows.

For example, when the color distribution is sparse, the frequency is concentrated in specific gradation values, and when the color distribution presents a gradation, the frequency is distributed to the respective gradation values. Thus, when the number of gradation values each having a frequency equal to or more than a first threshold $T_1$ is equal to or more than a predetermined number, the color channel selection module 108 may determine that the color distribution is sparse. For example, when the predetermined number is two, because the number of gradation values each having the frequency equal to or more than the threshold $T_1$ is three, which is equal to or more than the predetermined number, in the histogram in the red channel illustrated in FIG. 11, the color channel selection module 108 determines that the color distribution in the red channel is sparse. On the other hand, the histograms hardly change from those of FIG. 6 and FIG. 7 even when the equalization processing is applied in the green channel and the blue channel, and hence the number of the gradation values each having the frequency equal to or more than the threshold $T_1$ is thus zero, and is thus less than the predetermined number. Thus, the color channel selection module 108 determines that the color distributions in the green channel and the blue channel are not sparse.

Moreover, for example, when the color distribution is sparse, the number of the gradation values having a frequency of 0 is large, and when the color distribution presents a gradation, the gradation values having the frequency of 0 hardly exists. Therefore, conversely to the above description, the color channel selection module 108 may determine that the color distribution is sparse when the number of gradation values each having a frequency equal to or more than a second threshold $T_2$ ($T_2 \ll T_1$) is less than a predetermined number. For example, when the predetermined number is ten, because the number of gradation values each having the frequency equal to or more than the threshold $T_2$ is six, which is less than the predetermined number, in the histogram in the red channel illustrated in FIG. 11, the color channel selection module 108 determines that the color distribution in the red channel is sparse. On the other hand, the histograms hardly change from those of FIG. 6 and FIG. 7 even when the equalization processing is applied in the green channel and the blue channel, and hence the number of the gradation values each having the frequency equal to or more than the threshold $T_2$ is large, and is thus equal to or more than the predetermined number. Thus, the color channel selection module 108 determines that the color distributions in the green channel and the blue channel are not sparse.

Moreover, for example, in a case where not the number of the gradation values, but a distance between peaks is focused on, the distances between the peaks are long when the color distribution is sparse, whereas the distances between the peaks are short when the color distribution presents a gradation. Therefore, the color channel selection module 108 may determine that the color distribution is sparse when a distance D between peaks (for example, a frequency equal to or more than the threshold $T_2$ is considered as a peak) is equal to or longer than a predetermined distance (for example, five). The distance D is a value of a difference between a gradation value of a certain peak and a gradation value of a neighboring peak. The predetermined distance may be determined based on the change amount ("1" in the example described in the embodiment) in the numerical values $R_{xy}$, $G_{xy}$, and $B_{xy}$ when the watermarks are embedded. This is because, when the numerical values $R_{xy}$, $G_{xy}$, and $B_{xy}$ are changed through the embedment of the watermarks, the numerical value is prevented from being the same as that of a neighboring peak. For example, the predetermined distance is a smaller value than the change amount of the numerical value. In the histogram (FIG. 11) in the red channel, of distances $D_1$ to $D_5$ between respective peaks, the shortest one is a distance $D_4$ between "180" and "205" of 25, which is equal to or longer than the predetermined distance, and hence the color channel selection module 108 determines that the color distribution in the red channel is sparse. On the other hand, the histograms hardly change from those of FIG. 6 and FIG. 7 even when the equalization processing is applied in the green channel and the blue channel, and hence the distances D between peaks is "1" or "2", and is thus less than the predetermined distance. Thus, the color channel selection module 108 determines that the color distributions in the green channel and the blue channel are not sparse.

The image processing module 105 is configured to embed the watermarks in the color channel selected by the color channel selection module 108 out of the plurality of color channels. In other words, the image processing module 105 does not embed the watermarks in the color channels that are not selected by the color channel selection module 108, and hence the numerical values in those color channels do not change. In the example of FIG. 3 to FIG. 7, the color distribution is sparse in the red channel, and the color distributions are not sparse in the green channel and the blue channel. The image processing module 105 thus embed the watermarks only in the red channel out of the three color channels.

With Modification Example (1), the watermarks are embedded only in a color channel in which the color distribution of the histogram is sparse and the watermarks are thus easily detected. Thus, a total change amount of the pixel values can be suppressed when the watermarks are embedded, and the invisibility of the watermarks can be increased. For example, the total change amount of the pixel value is only one when the watermarks are embedded only in the red channel, but the total change amount of the pixel value is three in total when the watermarks are embedded in all the channels. With this respect, in Modification Example (1), the change amounts of the pixel values are suppressed by embedding the watermarks only in the color channel in which the color distribution is sparse. Thus the watermarks are easily detected, and the invisibility of the watermarks can be increased so that the user is less likely to recognize the watermarks.

(2) Moreover, for example, the human eyes are sensitive to green, and thus more likely to notice a change in green, and hence embedment of the watermarks in the green channel may be avoided in a whitish region. Further, in this case, the watermarks may be embedded in the red channel, to which the human eyes are insensitive.

The image processing module 105 in Modification Example (2) of the present invention includes the determination module 105A. The determination module 105A is configured to determine whether or not the region in the color image in which the watermarks are embedded is whitish. Whitish colors include white and similar colors, and are, for example, white (#FFFFFD), ecru (#F7F6EB), white to off-slightly yellowish (#FFFDE6), white yellowish very slightly (#FFFFFA), milk-white (#FFFFFB), lead white (#F6FBF6), and grayish white (#EFE8D7). Each of the descriptions in parentheses is an indication of a pixel value of a 24-bit color image as a hexadecimal number. The determination module 105A determines whether or not the pixel values in the region in which the watermarks are embedded are within a predetermined range. The predetermined range is only required to be a range in which the whitish pixel values are defined, and is a range in which a displacement from the above-mentioned hexadecimal numbers is within a predetermined value.

When the determination module 105A determines that the region is whitish, the image processing module 105 embeds watermarks only in the red channel and the blue channel. When the determination module 105A determines that the region is not whitish, the image processing module 105 embeds watermarks in all the color channels. In other words, when the determination module 105A determines that the region is whitish, the image processing module 105 does not embed a watermark in the green channel. A method itself of embedding the watermarks in the color channels is the same as the method described in the embodiment.

With Modification Example (2), when the watermarks are embedded in the whitish region, the watermark is not embedded in the green channel, to which the human eyes are sensitive. Thus, the watermarks embedded in this region can be made less likely noticeable, thereby increasing the invisibility.

(3) Moreover, for example, in the embodiment, as illustrated in FIG. 3, the case in which the watermarks in the respective color channels do not overlap one another is exemplified, but the watermarks may overlap one another. The image processing module 105 in Modification Example (3) of the present invention is configured to embed watermarks having respective sizes so that the watermarks embedded in the respective color channels partially or entirely overlap one another.

For example, the image processing module 105 determines positions at which the watermarks are to be embedded so that a part of the watermarks to be embedded in the red channel and a part of the watermarks to be embedded in the green channel or the blue channel overlap one another. Moreover, for example, the image processing module 105 determines positions at which the watermarks are to be embedded so that the watermarks to be embedded in the red channel contain all watermarks to be embedded in the green channel or the blue channel. The watermarks may be embedded at the same positions in the respective color channels.

With Modification Example (3), the watermarks in the respective color channels can be arranged so as to overlap one another. Thus, a space can efficiently be used, thereby increasing the number of watermarks to be embedded in the image.

(4) Moreover, for example, in the embodiment, a description has been given of the case in which directions of all the watermarks are the same, but the directions of the watermarks may be different from one another. The image processing module 105 in Modification Example (4) of the present invention is configured to change directions of the watermarks to be embedded in the respective plurality of color channels so that the directions are different from one another. The image processing module 105 may change the directions of the watermarks so that the directions are different from one another in one color channel, or so that the direction of the watermarks in one color channel and the direction of the watermarks in another color channel are different from each other. Further, the image processing module 105 may embed the watermarks so that the directions of the watermarks in the respective color channels are different from one another.

Figure 12:
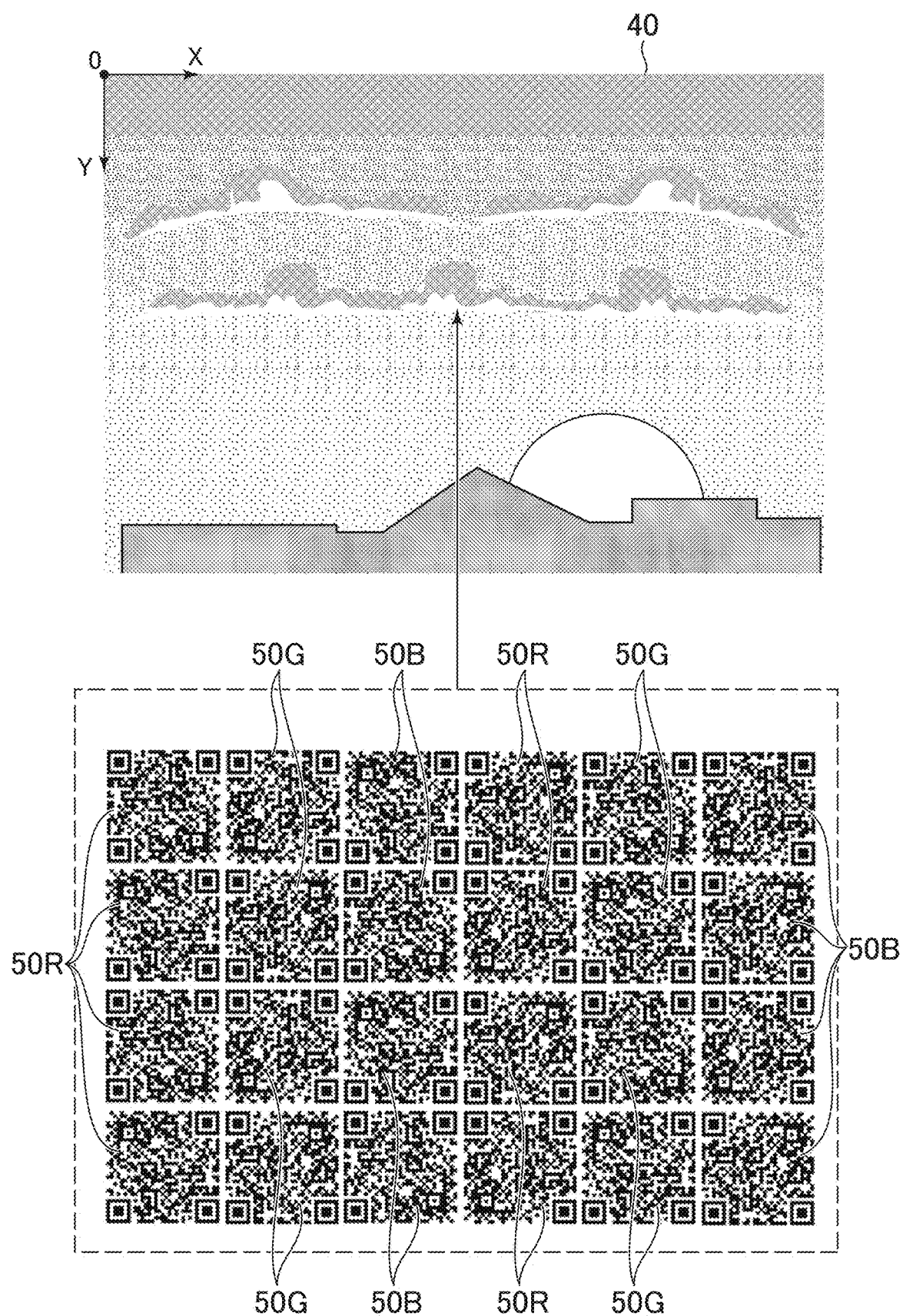
FIG. 12 is a diagram for illustrating how watermarks having directions different from one another are embedded.

FIG. 12 is a diagram for illustrating how the watermarks having directions different from one another are embedded. In this case, the image processing module 105 prepares the watermarks by rotating the watermarks clockwise by 90° each time with respect to the direction (FIG. 4) described in the embodiment as a reference (0°). In other words, the image processing module 105 prepares four types of the watermarks rotated by 0°, 90°, 180°, and 270°, respectively. In the example illustrated in FIG. 12, two watermarks exist for each of those four types of the watermarks 50 to be embedded in the respective color channels.

For the sake of a simple description, a description has been given of the case in which the watermarks in all the directions are embedded in all the color channels, but the image processing module 105 may embed the watermarks so that the number of directions are different from each other in the respective color channels such that the watermarks only in one direction are embedded in the red channel, and the watermarks in a plurality of directions are embedded in the blue channel and the green channel. The watermarks in a plurality of directions are only required to exist as the entire color image 40.

With Modification Example (4), the watermarks in the plurality of directions are embedded in the color image 40. Thus, the certainty of the detection of the watermark can be increased. For example, when the watermarks in a single direction arranged are embedded in the horizontal direction, lower halves of all the watermarks are hidden by horizontal texts, and the watermarks may not be detected. However, when the watermarks are embedded in a plurality of directions, portions hidden by the texts are different from each other, and hence the watermarks can be detected by composing the watermarks through the processing in Step S29.

(5) Moreover, for example, in the embodiment, a description has been given of the case in which sizes of all the watermarks are the same, but the sizes of the watermarks may be different from one another. The image processing module 105 of Modification Example (5) is configured to change sizes of the watermarks to be embedded in the respective plurality of color channels so that the sizes are different from one another. The image processing module 105 may change the sizes of the watermarks so that the sizes of the watermarks are different from one another in one color channel, or the size of the watermarks in one color channel and the size of the watermarks in another color channel are different from each other. Further, the image processing module 105 may embed the watermarks so that the sizes of the watermarks in the respective color channels are different from one another.

Figure 13:
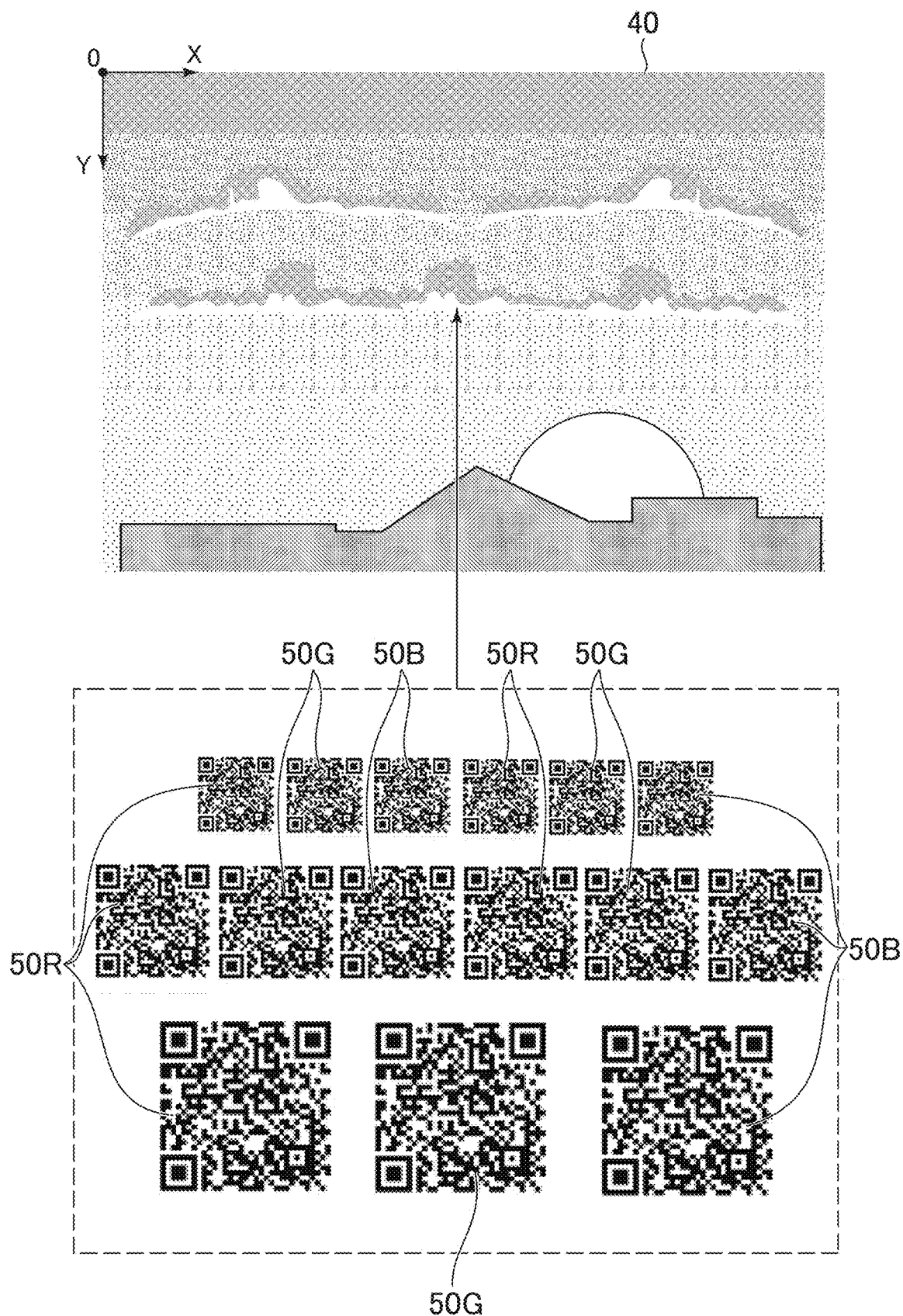
FIG. 13 is a diagram for illustrating how watermarks having sizes different from one another are embedded.

FIG. 13 is a diagram for illustrating how watermarks having sizes different from one another are embedded. In this case, the image processing module 105 prepares the watermarks by increasing or decreasing the sizes by predetermined factors with respect to the size (FIG. 4) of the watermarks described in the embodiment as a reference (100%). For example, the image processing module 105 prepares three types of watermarks, which are watermarks obtained by decreasing the size to 66%, the watermarks having the size of 100%, and watermarks obtained by increasing the size to 150%. In the example illustrated in FIG. 12, two watermarks 50 for each of the 66% and 100% sizes and one watermark 50 having the 150% size are embedded in each of the color channels.

For the sake of a simple description, a description has been given of the case in which the watermarks in all the sizes are embedded in all the color channels, but the image processing module 105 may be configured so that the number of sizes are different from each other in the respective color channels such that the watermarks only having one size are embedded in the red channel, and the watermarks having a plurality of sizes are embedded in the blue channel and the green channel. The watermarks having a plurality of sizes are only required to exist as the entire color image 40.

With Modification Example (5), the watermarks having the plurality of sizes are embedded in the color image 40, and hence the certainty of the detection of the watermarks can be increased. For example, when the user cuts a part of the image, a small watermark is less likely to be cut than a large watermark, and hence the small watermark is resistant against the cutting. On the other hand, when the user increases or decreases the size of the image, the cells of the large watermark are less likely to collapse than those of the small watermark, and hence the large watermark is resistant against the increase or decrease in size. Even when the user processes the image, the probability of the detection of the watermarks can be increased by embedding the watermarks having the plurality of sizes in the color image 40 in this way.

(6) Moreover, for example, the change amounts of the numerical values when the watermarks are embedded are the same in all the color channels in the embodiment, but the change amounts may be different from one another in the respective color channels. The image processing module 105 in Modification Example (6) of the present invention is configured to change the change amounts of the numerical values $R_{xy}$, $G_{xy}$, and $B_{xy}$ when the watermarks are embedded in the respective plurality of color channels so that the change amounts are different from one another. The image processing module 105 may change the change amounts so that the change amounts in all the three color channels are different from one another, or so that the change amounts are the same in any two of the color channels, and the change amount is different in only the remaining one color channel. For example, the human eyes are sensitive to green, and hence the image processing module 105 may be configured so that the change amount (for example, 1) of the numerical value $G_{xy}$ is less than the change amounts (for example, 2) of the numerical values $R_{xy}$ and $B_{xy}$.

With Modification Example (6), the change amounts of the numerical values $R_{xy}$, $G_{xy}$, and $B_{xy}$ can be made different from one another in accordance with the color channels when the watermarks are embedded. Thus, the invisibility can be increased while the certainty of the detection of the watermarks is increased.

(7) Moreover, for example, two or more of the first to six modified examples may be combined.

Moreover, for example, in the embodiment, a description has been given of the case in which the watermark detection processing is carried out in the respective color channels, but, for example, when only a part of the watermarks has successfully been detected in the respective color channels, the watermarks detected in the respective color channels may be composed. For example, detection of one watermark may be tried by composing a part of the watermark detected in the red channel, a part of the watermark detected in the green channel, and a part of the watermark detected in the blue channel. Moreover, for example, when the watermarks are detected in a plurality of color channels, priorities may be assigned to the respective color channels, and the watermark in a color channel having a higher priority may be trusted. For example, when priority higher than that assigned to the watermark in the green channel is assigned to the watermark in the red channel, and the watermarks are detected both in the red channel and the green channel, the message may be output based on the watermark in the red channel.

Moreover, for example, the image processing module 105 may be configured to carry out the histogram equalization processing in each of regions in the color image, and embed the watermarks in a region having a sparse color distribution. A method of determining whether or not the color distribution is sparse in a region is the same as the method described in Modification Example (1).

Moreover, for example, a description has been given of the case in which the watermarks are embedded in the still image data, but watermarks may be embedded in moving image data. Further, a code other than the 2D code may be used as the watermark, and an image and a text other than the code may be used as the watermark. Moreover, for example, any information may be contained in the watermark, and information other than the information on the user who has requested the image data may be contained.

Moreover, for example, the functions described as being implemented in the image processing server 10 may be implemented in another computer (for example, the user terminal 20 or the administrator terminal 30). In this case, the computer in which the functions described above are implemented corresponds to the image processing device of the present invention. Moreover, out of the above-mentioned functions, functions other than the image data acquisition module 102, the numerical value acquisition module 103, and the image processing module 105 may be omitted.

The invention claimed is:

1. An image processing device, comprising at least one processor configured to:
   acquire image data of a color image having a red channel, a green channel, and a blue channel as a plurality of color channels;
   acquire respective numerical values in the plurality of color channels contained in a pixel value of the color image based on the image data;
   determine whether a region of the color image in which a watermark is to be embedded is whitish; and
   embed the watermark in each of the plurality of color channels by changing the numerical value;
   wherein watermarks are embedded in only the red channel and the blue channel when the region is determined to be whitish, and the watermarks are embedded in all the plurality of color channels when the region is determined to be non-whitish.

2. The image processing device according to claim 1, wherein the at least one processor is configured to embed watermarks so that a part or all of the watermarks in the respective plurality of color channels overlap one another.

3. The image processing device according to claim 1,
   wherein the at least one processor is configured to receive a request for the image data by a user,
   wherein the watermark contains information for identifying the user requesting the image data, and
   wherein the at least one processor is configured to provide the image data which has the watermark to the user who has made the request.

4. The image processing device according to claim 1, wherein the at least one processor is configured to change directions of watermarks to be embedded in the respective plurality of color channels so that the directions are different from one another.

5. The image processing device according to claim 1, wherein the at least one processor is configured to change sizes of watermarks to be embedded in the respective plurality of color channels so that the sizes are different from one another.

6. An image processing method, comprising:
   acquiring image data of a color image having a red channel, a green channel, and a blue channel as a plurality of color channels;
   acquiring respective numerical values in the plurality of color channels contained in a pixel value of the color image based on the image data;
   determining whether a region of the color image in which a watermark is to be embedded is whitish; and
   embedding the watermark in each of the plurality of color channels by changing the numerical value;
   wherein watermarks are embedded in only the red channel and the blue channel when the region is determined to be whitish, and the watermarks are embedded in all the plurality of color channels when the region is determined to be non-whitish.

7. A non-transitory computer-readable information storage medium for storing a program for causing a computer to:
   acquire image data of a color image having a red channel, a green channel, and a blue channel as a plurality of color channels;
   acquire respective numerical values in the plurality of color channels contained in a pixel value of the color image based on the image data;
   determine whether a region of the color image in which a watermark is to be embedded is whitish; and
   embed the watermark in each of the plurality of color channels by changing the numerical value;
   wherein watermarks are embedded in only the red channel and the blue channel when the region is determined to be whitish, and the watermarks are embedded in all the plurality of color channels when the region is determined to be non-whitish.

* * * * *